United States Patent

[11] 3,624,440

| [72] | Inventor | Hans-Peter Latussek<br>Feucht, Germany |
|---|---|---|
| [21] | Appl. No. | 10,434 |
| [22] | Filed | Feb. 11, 1970 |
| [45] | Patented | Nov. 30, 1971 |
| [73] | Assignee | Siemens Aktiengesellschaft<br>Berlin and Munich, Germany |
| [32] | Priority | Feb. 13, 1969 |
| [33] | | Germany |
| [31] | | P 19 07 137.5 |

[54] POLARIZED SYNCHRONOUS PILOT MOTOR
6 Claims, 11 Drawing Figs.

[52] U.S. Cl. .................................................. 310/162,
310/156
[51] Int. Cl. .......................................... H02k 21/00
[50] Field of Search ............................................ 310/156,
49, 266, 162, 163, 164, 40 MM, 43, 90, 51, 72

[56] References Cited
UNITED STATES PATENTS
| 2,187,180 | 1/1940 | Schweitzer .................. | 310/163 |
| 3,037,822 | 6/1962 | Plummer ...................... | 310/72 |
| 3,119,941 | 1/1964 | Guiot ........................... | 310/156 |
| 3,164,734 | 1/1965 | Heinzen ....................... | 310/156 |
| 3,197,659 | 7/1965 | Marshall ...................... | 310/49 |
| 3,268,751 | 8/1966 | Nebiolo ....................... | 310/156 |
| 3,361,914 | 1/1968 | Janssen ....................... | 310/51 |
| 3,421,032 | 1/1969 | Kohlhagen ................... | 310/164 |
| 3,452,228 | 6/1969 | Woolley ....................... | 310/162 |

Primary Examiner—D. X. Sliney
Assistant Examiner—R. Skudy
Attorneys—Curt M. Avery, Arthur E. Wilfond, Herbert L. Lerner and Daniel J. Tick ABSTRACT: Polarized synchronous pilot motor includes a rotary permanent magnet armature, a plurality of pole members of alternating polarity coaxially surrounding the armature, stator pole plates supporting the armature at both ends thereof, a stator coil for exciting the armature being disposed coaxially thereto, the stator coil being carried by a coil carrying member formed with projections of plastic material extending coaxially to the armature and serving directly as bearing support for the armature.

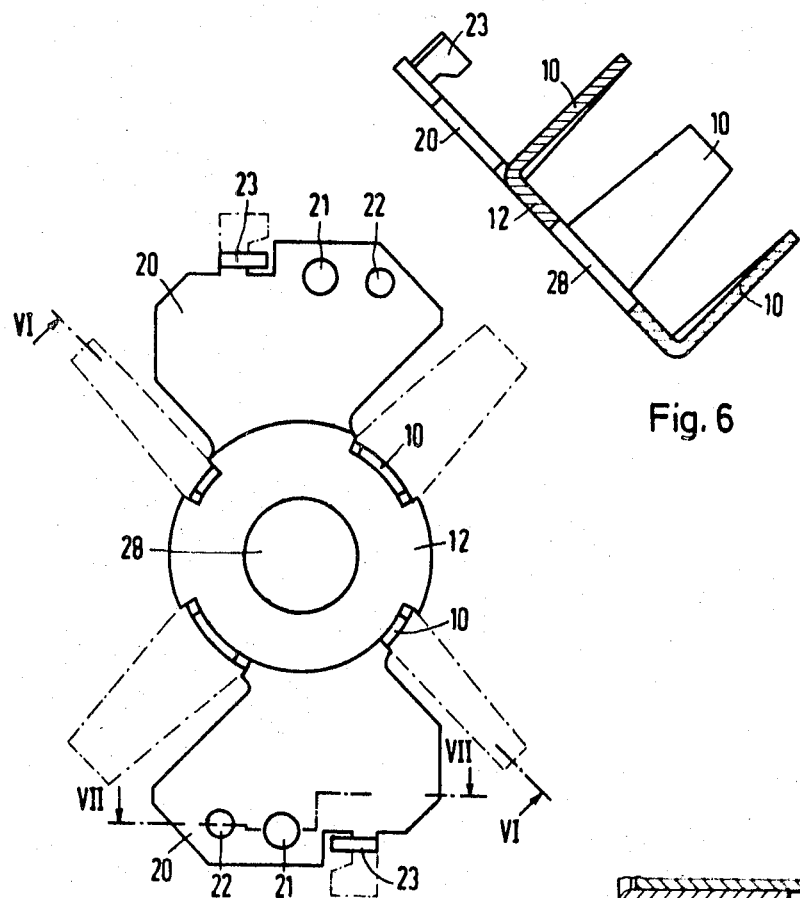
Fig. 6
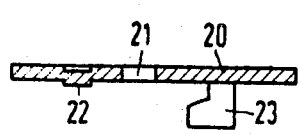
Fig. 5
Fig. 7
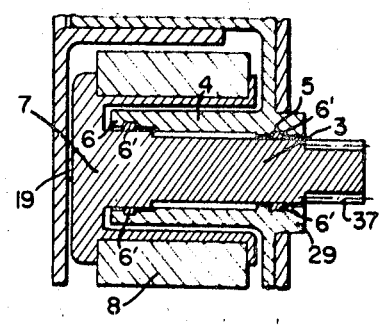
Fig. 11

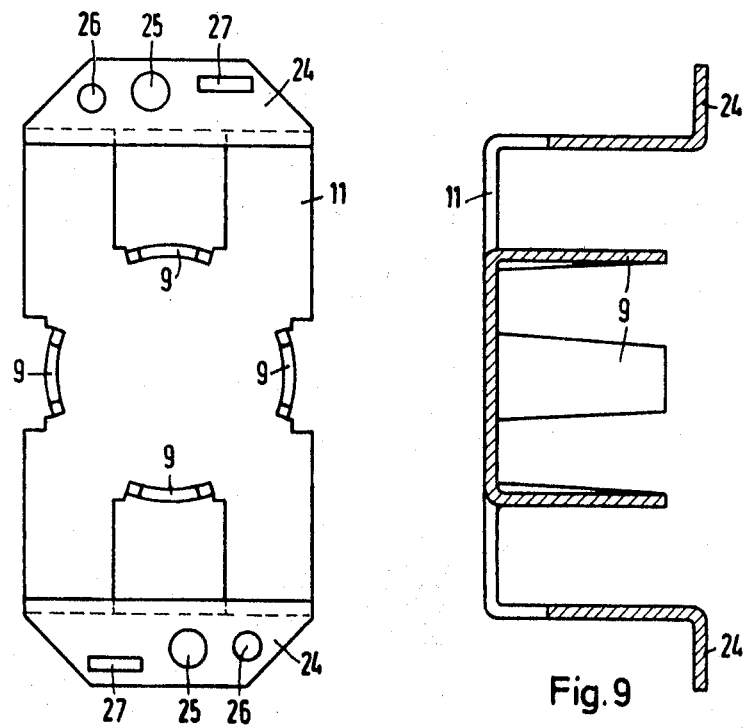
Fig. 8
Fig. 9
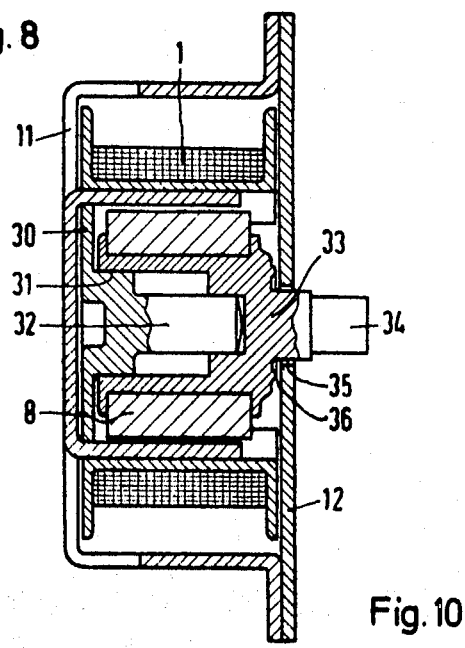
Fig. 10

POLARIZED SYNCHRONOUS PILOT MOTOR

My invention relates to polarized synchronous pilot or midget motor and more particularly to such motor having a permanent magnet armature coaxially surrounded by dog poles of alternating polarity, the armature being supported at both ends thereof by stator pole plates and being excitable by a stator coil disposed coaxially to the armature.

In the heretofore known synchronous pilot motors of this general type, the motor bearings are generally inserted in stator pole plates located at the end faces thereof. The motor bearings per se are formed either of plastic material or sintered metal. The insertion of the bearings requires very accurate manufacturing techniques since the bearing locations must be very accurately aligned.

It is accordingly an object of my invention to provide polarized synchronous pilot motor whose assembly and disassembly are greatly facilitated.

With the foregoing and other objects in view, I provide, in accordance with my invention, polarized synchronous pilot motor comprising a rotary permanent magnet armature, a plurality of pole pieces of alternating polarity coaxially surrounding the armature, stator pole plates supporting the armature at both ends thereof, a stator coil for exciting the armature being disposed coaxially thereto, the stator coil being carried by a coil carrying member formed with projections of plastic material extending coaxially to the armature and serving directly as bearing means for the armature.

In accordance with another feature of my invention, the armature includes a shaft for the motor, and the projection comprise an injection-molded tubular projection for receiving the motor shaft therethrough.

In accordance with a further feature of my invention, bearing surfaces are directly provided on the tubular projection, the coil carrier member and the projection thereof being of the same plastic material which is simultaneously employed as bearing material.

In accordance with yet another feature of my invention, bearings of plastic or sintered material are disposed in the tubular projection, being injection-molded with the coil carrier member during the production of the latter, so that an exceptionally good alignment of the bearing surfaces is automatically produced.

In accordance with an additional feature of my invention, the armature has an annular portion of plastic material carrying the permanent magnets and is provided with a shaft stub formed with bearing surfaces.

Other features which are considered as characteristics for the invention are set forth in the appended claims.

Although the invention is illustrated and described herein as embodied in polarized synchronous pilot or midget motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 5 is a view of one of the stator pole plates forming part of the motor of FIG. 1;

FIG. 6 is a sectional view of FIG. 5 taken along the line VI—VI;

FIG. 7 is a sectional view of FIG. 5 taken along the line VII—VII;

FIG. 8 is a view of the other of the stator pole plates forming part of the motor of FIG. 1;

FIG. 9 is a sectional view of FIG. 8 taken along the line IX—IX;

FIG. 10 is a view similar to that of FIG. 1 of another embodiment of the motor of my invention; and FIG. 11 is a fragmentary view of FIG. 1, showing a modification of the bearing parts thereof.

Figure 1:
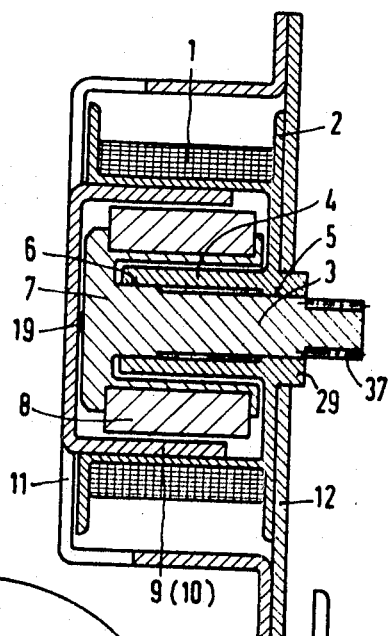
FIG. 1 is a longitudinal sectional view of a polarized synchronous pilot motor constructed in accordance with my invention.

Referring now to the drawings, and first particularly to FIGS. 1 to 4 thereof, there is shown a polarized synchronous pilot motor, according to my invention, having a stator coil 1 carried by a coil carrying member 2. A tubular projection 4, coaxial to the armature shaft 3 of the motor, is injection-molded on the coil carrying member 2, bearing surfaces 5 and 6 being formed on the projection 4 and cooperating with corresponding bearing surfaces on the armature shaft 3.

In the embodiment of FIG. 1, the armature shaft 3 is injection-molded from a carrier 7 for an annular permanent magnet 8. The annular permanent magnet has at the peripheral surface thereof uniformly distributed alternating north and south poles in an amount corresponding to the number of pole prongs 9 and 10 stamped out of both stator pole plates 11 and 12, located at opposite ends of the armature shaft 3, and being bent therefrom in the direction of the armature shaft 3.

Figure 2:
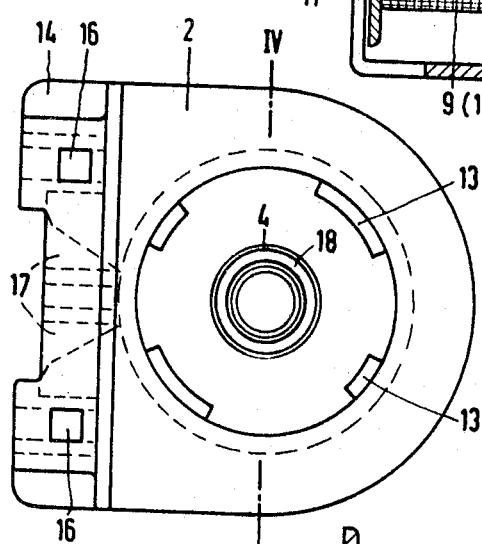
FIG. 2 is an elevational view of a coil carrying member forming part of the motor of FIG. 1.
Figure 3:
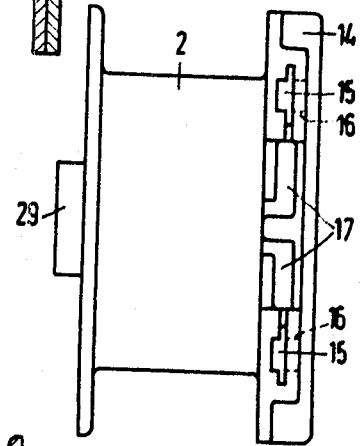
FIG. 3 is a left-hand side view of FIG. 2.
Figure 4:
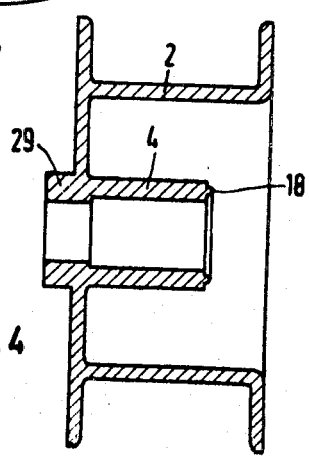
FIG. 4 is a sectional view of FIG. 2 taken along the line IV—IV.

As shown in FIG. 2, the coil carrying member 2 is formed with openings 13 through which the pole prongs 10 of the stator pole plate 12 extend. The pole prongs 9 and 10 of the stator pole plates 11 and 12 are centered by the inner surface of the coil carrying member 2. Centering pins can also be injection-molded on the coil carrying member 2 so that accurate tolerances of the inner diameter of the coil carrying member 2 may be dispensed with. The coil carrying member 2 is provided, furthermore, with a flange 14 (FIGS. 2 and 3) in which there are formed pockets 15 for receiving nonillustrated plug connections therein. OPenings or cut-outs 16 formed in the flange 14 serve to click the plug connections into place. In addition, channels 17 are formed in the coil carrier member 2 through which the lead terminals of the coil 1 are led to the plug connections. An annular starting surface 18 (FIGS. 2 and 4) is provided on the tubular projection 4 of the coil carrying member 2 and, together with an elevated portion 19 extending in the axial direction of the armature shaft 3, limits axial play of the shaft 3, the carrier 7 magnets 8 which constitute the armature.

In FIGS. 5 to 7 there is shown the stator pole plate 12 which is a stamped bending member. The original unbent stamped blank had the appearance shown in FIG. 5 including portions shown in phantom. Fastening holes 21 20 and knobs or protrusions 22 for centering purposes are provided on the parts 20 of the stator pole plate 12, which form the magnetic return circuit in the motor of my invention. In addition, fastening flaps or ears 23 are stamped out of the parts 20 and are bent substantially perpendicularly thereto.

In FIGS. 8 and 9, there is shown the other stator pole plate 11 having the bent pole prongs 9. The stator pole plate 11 is provided with two crank-shaped arms 24 which are provided with bores 25 and protrusions 26, corresponding to the bores 21 and protrusions 22 of the stator pole plate 12. When assembling the motor of my invention, the flaps or ears 23 of the stator pole plate 12 are inserted into openings 27 formed in the arms 24 and are bent. They thereby hold the motor of my invention together form-lockingly. The stator pole plate 12 is additionally provided with an opening or cutout 28 (FIG. 5) for receiving therein a centering flange 29 (FIGS. 1, 3 and 4) formed on the coil carrying member 2.

The assembly of the motor of my invention is effected in the following relatively simple manner. The coil carrier member 2 fully wound by the coil 1 is inserted in the centering hole 28 of the stator pole plate 12 so that the pole prongs 10 are inserted into the openings 13 formed in the coil carrying member 2. Then the shaft 3 of the armature is inserted into the tubular projection 4 of the coil carrying member 2, and the stator pole plate 11 is set thereon so that the pole prongs 9 are inserted into the bore of the coil carrier member 2, and the protrusions 22 and 26 are brought into contact with one another. Afterwards, the flaps or ears 23 passing through the openings 27 are bent.

In FIG. 10, there is illustrated another embodiment of the polarized synchronous pilot motor of my invention. Parts shown in FIG. 10 which are similar to parts shown in FIG. 1 are identified by the same reference numerals. In contrast to the aforedescribed embodiment shown in FIGS. 1 to 4, in the embodiment of FIG. 10, a centering flange 31 as well as a shaft 32 are formed on the coil carrying member 30 and cooperate with a correspondingly shaped bell-like carrier 33 for the annular permanent magnet 8 for the purpose of forming a bearing. A shaft stub 34 is formed on the carrier 33 and extends through an opening 35 provided in the stator pole plate 12. This shaft stub 34 can also have the construction of a pinion 37 as the shaft 3 has in the embodiment of FIG. 1.

The stator pole plates 11 and 12 of the embodiment shown in FIG. 10 are of the same construction as in the embodiment of FIG. 1. To limit axial play of the armature 8, 33, 34 of FIG. 10, an annular protrusion 36 is provided on the carrier 33 of the armature. Assembly of the motor embodiment of FIG. 10 is carried out in a similar manner as the herinbefore described assembly of the motor embodiment of FIG. 1.

In the aforedescribed and illustrated embodiments of the polarized synchronous pilot motor of my invention, the parts 4 and 7, on the one hand, and the parts 31, 32 and 33, on the other hand, which are made of plastic material, form the bearing surfaces proper. It is possible however, without any material additional cost, to provide metal rings 6' (as shown in FIG. 11), shafts or the like at the bearing surfaces proper of these parts 4, 7, 31, 32 and 33, which can be injection-molded in the respective plastic parts.

In the embodiment of FIG. 1, an armature having a steel shaft can also be used, and the steel shaft can then be mounted either directly or in suitably injection-molded sintered metal or plastic bearings provided in the tubular projection 4.

Both stator pole plates 11 and 12 can also be riveted, welded or bonded by adhesive to one another. The holes 21 and 25, which are aligned or in registry with one another, serve for fastening the motor to a suitable support.

I claim:

1. Polarized synchronous pilot motor comprising a rotary armature, a pair of stator pole plates supporting said armature at both ends thereof, said stator pole plates being mutually connected to form a bipartite housing of the motor, a coil-carrying member surrounding and spaced from said armature and having a tubular projection of plastic material extending coaxially to said armature, a stator coil carried by said coil-carrying member, said rotary armature having a shaft borne by said tubular projection and extending out of one side of said housing and a bell-shaped carrier portion coaxial to said shaft and integral therewith, and a plurality of permanent magnets secured circumferentially to the outer peripheral surface of said bell-shaped carrier portion, said stator pole plates having respective intermeshing pole prongs disposed in the space between said coil-carrying member and said armature and extending in axial direction of said armature and parallel to aid shaft thereof so as to be excitable by said stator coil.

2. Motor according to claim 1, wherein one end of said shaft is joined to the base of said bell-shaped carrier portion on the inside thereof, and is provided directly at said carrier portion base with an annular projection having a bearing surface, said tubular projection of said coil-carrying member having an extension with a bearing surface located at said one side of said housing from which said shaft extends.

3. Motor according to claim 1, wherein aid shaft is joined to the base of said bell-shaped carrier portion at the outside thereof, said bell-shaped carrier portion having two annular bearing surfaces on the inside thereof.

4. Motor according to claim 1, wherein said shaft, at an end thereof extending out of said one side of said housing, is constructed as a pinion.

5. Motor according to claim 1, including at least one metal ring disposed coaxially to nd between the tubular projection of said coil-carrying member and said armature, said metal ring having a bearing surface.

6. Motor according to claim 1, including a metal shaft disposed coaxially to said tubular projection of said coil-carrying member and said armature, said metal shaft having a bearing surface

* * * * *